US012780190B2

(12) United States Patent
Kwon et al.

(10) Patent No.: US 12,780,190 B2
(45) Date of Patent: Nov. 3, 2026

(54) METHOD AND SYSTEM FOR GENERATING VIRTUAL LANE

(71) Applicant: HL Klemove Corp., Incheon (KR)

(72) Inventors: Junsung Kwon, Pyeongtaek-si (KR); Haejin Hwang, Pyeongtaek-si (KR); Jaehwan Kim, Pyeongtaek-si (KR); Donghan Lee, Pyeongtaek-si (KR)

(73) Assignee: HL Klemove Corp., Incheon (KR)

( * ) Notice: Subject to any disclaimer, the term of this patent is extended or adjusted under 35 U.S.C. 154(b) by 74 days.

(21) Appl. No.: 18/967,153

(22) Filed: Dec. 3, 2024

(65) Prior Publication Data

US 2025/0326393 A1 Oct. 23, 2025

(30) Foreign Application Priority Data

Apr. 19, 2024 (KR) ........................ 10-2024-0052897

(51) Int. Cl.
*B60W 30/12* (2020.01)
*B60K 35/21* (2024.01)
*G01C 21/16* (2006.01)
*G08G 1/16* (2006.01)

(52) U.S. Cl.
CPC ........... *B60W 30/12* (2013.01); *B60K 35/213* (2024.01); *G01C 21/165* (2013.01); *G08G 1/167* (2013.01)

(58) Field of Classification Search
CPC .... B60W 30/12; G01C 21/165; B60K 35/213
See application file for complete search history.

(56) References Cited

U.S. PATENT DOCUMENTS

2011/0301813 A1* 12/2011 Sun ...................... B62D 15/029 348/148
2014/0005906 A1* 1/2014 Pandita ................. B60W 40/04 706/46
2014/0152829 A1* 6/2014 Suzuki ................. G06V 20/584 348/148
2018/0129854 A1* 5/2018 Jeon ....................... G06V 20/58
2019/0202453 A1* 7/2019 Farooqi ................. B60W 30/12
2019/0337513 A1* 11/2019 Kim ...................... B60W 30/12
2020/0257271 A1* 8/2020 Wolff ................. G05B 19/4183
2020/0410260 A1* 12/2020 Choe ................. B60W 60/0027
2021/0148724 A1* 5/2021 Bang .................... G05D 1/0287
2025/0128706 A1* 4/2025 Song ..................... B60W 30/12
2025/0299499 A1* 9/2025 Zhou .................... G06V 20/588

* cited by examiner

*Primary Examiner* — Erin M Piateski
*Assistant Examiner* — Gabriel Joseph Rene Lambert
(74) *Attorney, Agent, or Firm* — Studebaker Brackett PLLC

(57) ABSTRACT

A method and a system for generating a virtual lane are provided, and the method for generating the virtual lane according to an embodiment of the present disclosure comprises: determining a lane recognition limit situation in which a lane in front of an ego vehicle is not recognized; determining whether conditions for entering a virtual lane generation mode are satisfied in the lane recognition limit situation; if the conditions for entering the virtual lane generation mode are satisfied, entering the virtual lane generation mode; processing previous lane information, information of the ego vehicle, and information of a front vehicle; generating the virtual lane based on the processed information; and controlling the ego vehicle based on the generated virtual lane.

16 Claims, 10 Drawing Sheets

FIG. 9

| Lane Type | Value Error | | | | | | | |
|---|---|---|---|---|---|---|---|---|
| | $N$ (lane position) | | $\phi$ (heading angle) | | $\kappa$ (curvature) | | $\dot{\kappa}$ (curvature rate) | |
| | Short Range (~30 m) | Long Range (~60m) | Short Range (~30 m) | Long Range (~60m) | Short Range (~30 m) | Long Range (~60m) | Short Range (~30 m) | Long Range (~60m) |
| High Curve (curvature ↑ : $5 \cdot 10^{-3}$) | 0.182m | 1.736m | 0.0232 rad | 0.100 rad | 0.0023 | 0.0041 | $7.67 \cdot 10^{-5}$ | $7.67 \cdot 10^{-5}$ |
| Low Curve (Curvature ↓ : $10^{-4}$) | 0.0861m | 1.140m | 0.0138 rad | 0.0716 rad | 0.0016 | 0.0027 | $4.44 \cdot 10^{-5}$ | $4.44 \cdot 10^{-5}$ |
| Straight (Curvature ↓ : $10^{-5}$) | 0.0219m | 0.281m | 0.0034 rad | 0.0181 rad | $0.362 \cdot 10^{-3}$ | $0.362 \cdot 10^{-3}$ | $1.48 \cdot 10^{-5}$ | $1.48 \cdot 10^{-5}$ |

METHOD AND SYSTEM FOR GENERATING VIRTUAL LANE

CROSS-REFERENCE TO RELATED APPLICATION

This application claims the benefit of and priority to Korean Patent Application No. 10-2024-0052897 filed on Apr. 19, 2024, the entire disclosures of which are incorporated herein by reference.

TECHNICAL FIELD

The present disclosure relates to a method and system for generating a virtual lane. More specifically, the present disclosure relates to a method and system for generating a virtual lane to generate an optimal virtual lane with high accuracy in a lane recognition limit situation in which it is difficult to recognize the lane.

BACKGROUND

In a vehicle, a driver assistance system provides assistance to the driver while driving in the vehicle for the driver's convenience.

The driver assistance system is a system that detects accidents that may occur while driving or parking using various sensors, vision systems, and laser systems, and then warns the driver or controls the vehicle. In particular, the lane recognition system is a basic system for recognizing a lane and providing control functions for changing lanes or following the lane based on the recognized lane.

Meanwhile, the lane recognition system recognizes lanes by acquiring lane information from image information using an image sensor in order to provide control functions for changing lanes or following the lane. Therefore, if lane recognition by the image sensor fails, the lane change control or the lane following control may be seriously affected.

Situations in which lane detection fails may occur in various driving environments. For example, in situations such as bad weather, road wear, damaged or erased lane markers, intersections or complex road structures, the sensors of the vehicle may not be able to accurately detect lanes. In these cases, safe driving becomes difficult, and problems may arise in tracking the vehicle's location and maintaining its route.

Therefore, in the lane recognition limit situations in which it is difficult to recognize the lane, there is a need for a method and system for generating a virtual lane to generate a virtual lane with high accuracy by optimizing lane parameters even if there are changes in the lane parameters.

SUMMARY

The present disclosure is to solve the above-mentioned problems of the prior art, and the object of the present disclosure is to provide a method and system for generating a virtual lane by considering uncertainty in lane recognition limit situations and utilizing the generated virtual lane to control the driving of the vehicle.

Further, the object of the present disclosure is to provide a method and system for generating a virtual lane through parameter optimization using the vehicle's sensor data and existing lane data, thereby allowing the vehicle to drive more safely even when the lane detection fails.

However, the technical problem to be achieved by the embodiments of the present disclosure is not limited to the technical problems described above, and other technical problems may exist.

As a technical means for achieving the above technical problem, a method for generating a virtual lane according to an embodiment of the present disclosure comprises: determining a lane recognition limit situation in which a lane in front of an ego vehicle is not recognized; determining whether conditions for entering a virtual lane generation mode are satisfied in the lane recognition limit situation; if the conditions for entering the virtual lane generation mode are satisfied, entering the virtual lane generation mode; processing previous lane information, information of the ego vehicle, and information of a front vehicle; generating the virtual lane based on the processed information; and controlling the ego vehicle based on the generated virtual lane.

Further, the lane recognition limit situation in which the lane in front of the ego vehicle is not recognized may be a situation in which the lane is not recognized because the lane is obscured by the front vehicle.

Further, if a distance between the ego vehicle and the front vehicle is less than a predetermined distance, a difference between heading angles of the ego vehicle and the front vehicle is less than a predetermined angle, and a speed of the ego vehicle is less than a predetermined speed, it may be entered the virtual lane generation mode.

Further, the processing of information may comprise updating position information of the ego vehicle using a dead reckoning technique and performing coordinate transformation to use previous lane information for current position.

Further, the processing of information may further comprise estimating a predicted position of the front vehicle using an Extended Kalman Filter.

Further, the generation of the virtual lane may comprises: a calculating a weighting matrix for the lane and a weighting matrix for the front vehicle based on lane information according to a view range of the ego vehicle and position information according to the predicted position of the front vehicle; and optimizing lane coefficients based on the calculated weighting matrix for the lane and the weighting matrix for the front vehicle.

Further, in calculating the weighting matrix for the lane, a weight for lane information within the view range of the ego vehicle may be set to be higher than a weight for lane information beyond the view range of the ego vehicle, and wherein in calculating the weighting matrix for the front vehicle, a weight for current position of the front vehicle may be set to be higher than a weight for predicted position of the front vehicle.

Further, in optimizing of the lane coefficients, optimal lane coefficients may be obtained such that an objective function regarding an error regarding the previous lane information, an error regarding a position of the ego vehicle and the predicted position of the front vehicle, and an error for previously obtained lane coefficients has a minimum value, by using a Weighted Least Squares method according to Tikhonov regularization.

Further, the generating of the virtual lane may comprise generating the virtual lane by generating a center line trajectory of the virtual lane using a third-order polynomial based on the optimal lane coefficients obtained in the optimizing of the lane coefficients.

Further, the controlling of the ego vehicle may comprise controlling driving of the ego vehicle using the generated virtual lane until lane recognition is resumed, and when the lane recognition is resumed, the ego vehicle is controlled based on an actually recognized lane.

A system for generating a virtual lane according to embodiments of the present disclosure comprises: a first sensor configured to detect a lane in front of an ego vehicle and a front vehicle in front of the ego vehicle; a second sensor configured to detect body information of the ego vehicle; and a controller comprising at least one processor configured to process detection results of the first sensor and the second sensor, wherein the controller configured to determine whether conditions for entering a virtual lane generation mode are satisfied in a lane recognition limit situation in which the lane in front of the ego vehicle is not recognized, and if it is entered the virtual lane generation mode, the controller is configured to generate the virtual lane base on previous lane information, information of the ego vehicle, and information of the front vehicle processed by the at least one processor, and control the ego vehicle based on the generated virtual lane.

Further, the first sensor may comprise at least one of a front camera, a front radar, or a corner radar.

Further, the controller may be configured to determine that the conditions for entering the virtual lane generation mode are satisfied if a distance between the ego vehicle and the front vehicle is less than a predetermined distance, a difference between heading angles of the ego vehicle and the front vehicle is less than a predetermined angle, and a speed of the ego vehicle is less than a predetermined speed.

Further, the at least one processor may be configured to update the position information of the ego vehicle using a dead reckoning technique and perform coordinate transformation to use previous lane information for current position.

Further, the at least one processor may be configured to calculate a predicted position of the front vehicle using an Extended Kalman Filter.

Further, the controller may be configured to calculate a weighting matrix for the lane and a weighting matrix for the front vehicle based on lane information according to a view range of the ego vehicle and position information according to the predicted position of the front vehicle, and optimize lane coefficients based on the calculated weighting matrix for the lane and the weighting matrix for the front vehicle.

Further, the controller may be configured to obtain optimal lane coefficients such that an objective function regarding an error regarding the previous lane information, an error regarding a position of the ego vehicle and the predicted position of the front vehicle, and an error for previously obtained lane coefficients has a minimum value, by using a Weighted Least Squares method according to Tikhonov regularization.

Further, the controller may be connected with a driving apparatus configured to control driving of the ego vehicle, a braking apparatus configured to control braking of the ego vehicle, and a steering apparatus configured to control lateral driving of the ego vehicle, and the controller may be configured to control the ego vehicle by controlling at least one of the driving apparatus, the braking apparatus, or the steering apparatus in operating a driver assistance function based on the generated virtual lane.

Further, the system for generating the virtual lane may further comprise: a display apparatus configured to display the generated virtual lane to a driver; and a warning apparatus configured to warn the driver in operating the driver assistance function based on the generated virtual lane.

A non-transitory computer-readable recording medium that records a program for executing a method for generating a virtual lane on a computer is provided, and the method comprises: determining a lane recognition limit situation in which a lane in front of an ego vehicle is not recognized; determining whether conditions for entering a virtual lane generation mode are satisfied in the lane recognition limit situation; if the conditions for entering the virtual lane generation mode are satisfied, entering the virtual lane generation mode; processing previous lane information, information of the ego vehicle, and information of a front vehicle; generating the virtual lane based on the processed information; and controlling the ego vehicle based on the generated virtual lane.

The above-described means for solving the problem is only exemplary and should not be construed as limiting the present disclosure. In addition to the exemplary embodiments described above, additional embodiments may exist in the drawings and the following detailed description.

According to the above-described problem-solving means of the present disclosure, it is possible to provide a method and system for generating a virtual lane that can effectively generate a virtual lane using previous lane information and predicted information of the ego vehicle and the front vehicle.

In addition, according to the above-described problem-solving means of the present disclosure, it is possible to provide a method and system for generating a virtual lane that can significantly improve the safety and reliability of an autonomous vehicle by maintaining a driving path even in situations where the existing lane recognition system fails.

However, the effects obtainable from the present disclosure are not limited to the effects described above, and other effects may exist.

BRIEF DESCRIPTION OF THE DRAWINGS

FIG. 9 is a table showing error values for each lane type as results of experimental examples of generating the virtual lane by the method for generating the virtual lane according to the embodiment of the present disclosure.

DETAILED DESCRIPTION

Figure 1:
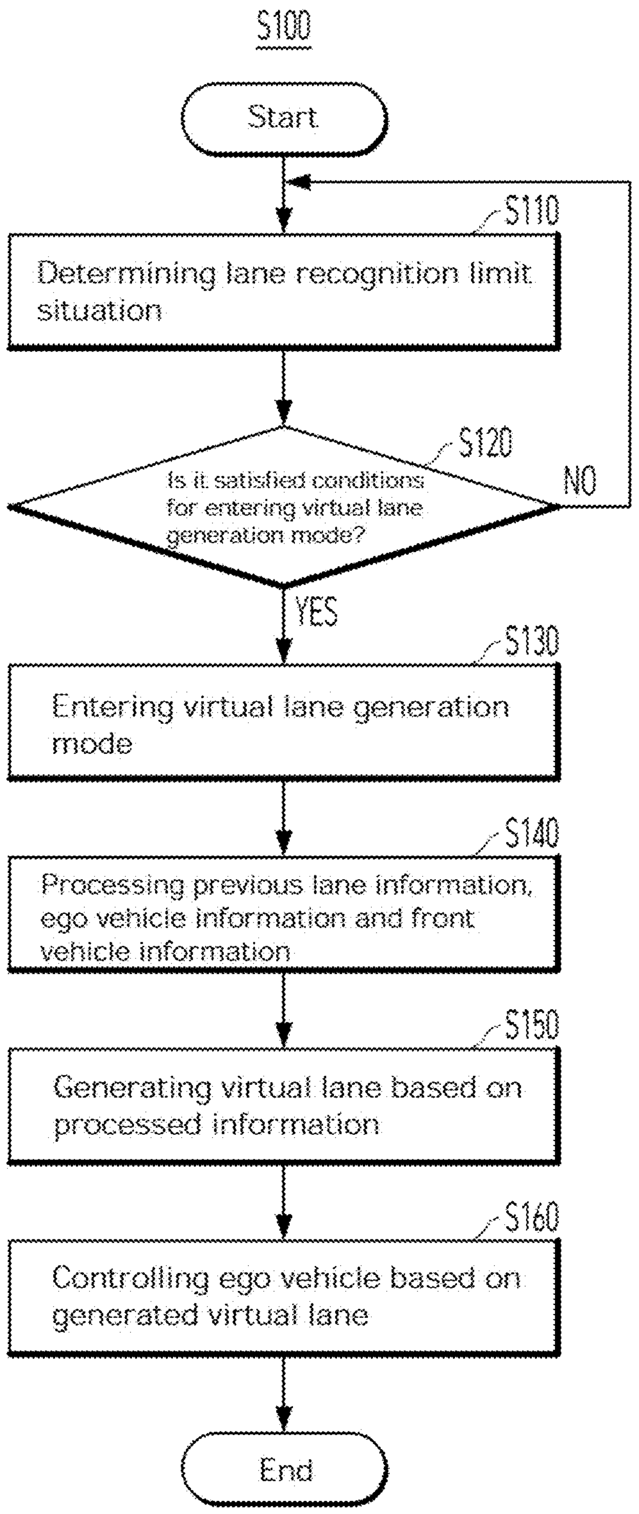
FIG. 1 is a control flowchart showing a method for generating a virtual lane according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a method and system for generating a virtual lane to generate a high-accuracy virtual lane in a situation where lane recognition is limited.

FIG. 1 is a control flowchart showing a method for generating a virtual lane according to an embodiment of the present disclosure.

Referring to FIG. 1 of the present disclosure, the method for generating the virtual lane S100 according to an embodiment of the present disclosure may comprise determining a lane recognition limit situation in which the lane in front of the ego vehicle is not recognized S110.

For example, the lane in front may be recognized by a front camera installed in the ego vehicle. On the other hand, the lane recognition limit situation may occur in which the lane is not fully recognized by a vehicle in front, for example, in a case where a CIPV (Closest In-Path Vehicle) (hereinafter referred to as 'front vehicle') exists in front of the ego vehicle (situation in which the lane is obscured by the front vehicle).

Next, determining whether the conditions for entering the virtual lane generation mode are satisfied in the lane recognition limit situation S120 may be performed.

Figure 2:
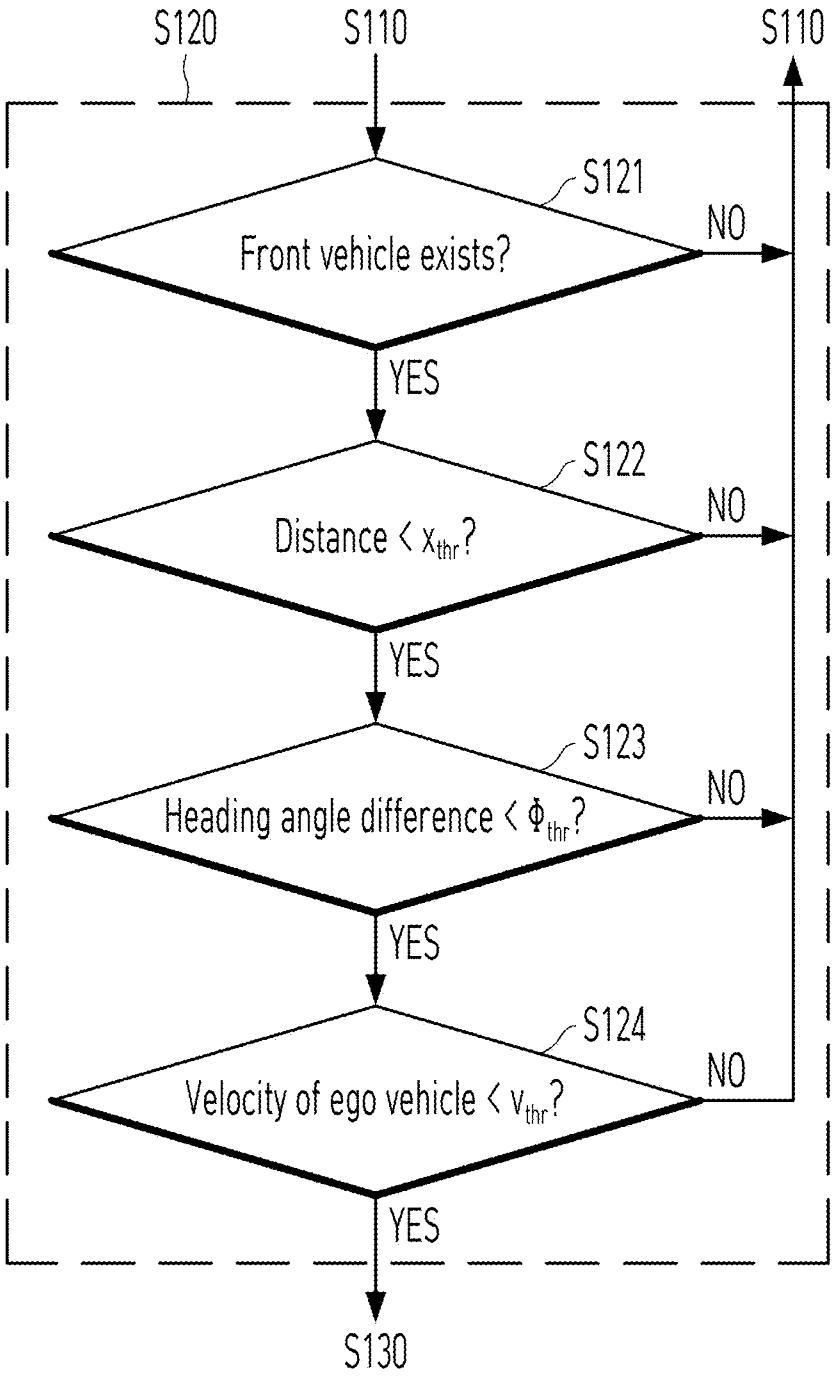
FIG. 2 is a diagram specifically showing the step of determining whether the conditions for entering the virtual lane generation mode are satisfied in the method for generating the virtual lane according to the embodiment of the present disclosure.

The step of determining whether the conditions for entering the virtual lane generation mode are satisfied in the lane recognition limit situation S120 will be explained in more detail with reference to FIG. 2. FIG. 2 is a diagram specifically showing the step of determining whether the conditions for entering the virtual lane generation mode are satisfied in the method for generating the virtual lane according to the embodiment of the present disclosure.

Referring to FIG. 2, first, it may be determined whether a front vehicle (CIPV) exists (S121), and if the front vehicle exists ('YES' in S121), it may be determined whether a distance between the ego vehicle and the front vehicle is less than a predetermined threshold value $x_{thr}$ (S122).

If the distance is less than the predetermined threshold value $x_{thr}$ ('YES' in S122), it may be determined whether the difference between the heading angle of the ego vehicle and the heading angle of the front vehicle is less than a predetermined angle $x_{thr}$ (S123). If the difference in heading angle is less than the predetermined angle $\phi_{thr}$ ('YES' in S123), it may be determined whether the speed of the ego vehicle is less than a predetermined speed $v_{thr}$ (S124).

If the condition that the speed of the ego vehicle is less than the predetermined speed $v_{thr}$ is satisfied in S124 ('YES' in S124), it may enter the virtual lane generation mode (S130). Meanwhile, if any one of the conditions of S121 to S124 is not satisfied (if any one of S121 to S124 is 'NO'), the process may return to the lane recognition limit situation determining step S110.

That is, as conditions for entering the mode, if all conditions are met such that there is the front vehicle, the distance between the front vehicle and the ego vehicle is less than the predetermined distance, the difference between the heading angle of the ego vehicle and the heading angle of the front vehicle is less than the predetermined angle, and the speed of the ego vehicle is less than the predetermined speed ('YES' in S120), it may enter the virtual lane generation mode (S130).

These threshold value parameters may be selected for the following reasons. If the distance between the ego vehicle and the front vehicle becomes significantly large, the status of the front vehicle may become ineffective in generating a virtual lane for the ego vehicle. In addition, if the difference between the heading angle of the ego vehicle and the heading angle of the front vehicle is large, the front vehicle may drive in a driving direction different from the direction that the ego vehicle may expect (e.g., when the front vehicle turns left, or when the front vehicle changes lanes, etc.). Additionally, if the speed of the vehicle is high, even small changes in lane parameters can greatly affect the driving status of the ego vehicle, and the sensitivity to the driving lane conditions may increase, especially in high-speed situations. Therefore, setting the threshold values may be essential to ensure that the virtual lane is a reliable reference for the driving.

On the other hand, if a new cut-in vehicle enters the driving lane, if the distance between the ego vehicle and the front vehicle is too far, if the difference in heading angles between the ego vehicle and the front vehicle becomes too large such as the case that the front vehicle turns left, or if the speed of the ego vehicle becomes too fast, the virtual lane generation mode may be released (deactivated). In addition, when updating the vehicle location by Dead Reckoning (DR), if the moving distance according to Dead Reckoning (DR) update exceeds a certain distance, the virtual lane generation mode may be released to prevent the negative impacts of accumulated errors.

Meanwhile, the parameters for releasing the virtual lane generation mode (parameters for the distance between the ego vehicle and the front vehicle, the difference in heading angle, and the speed of the ego vehicle) may have the same purpose as the parameters used for entering the virtual lane generation mode. However, the parameters for releasing the virtual lane generation mode may be set to higher values to prevent frequent mode entry and exit.

Returning to FIG. 1, if it is entered the virtual lane generation mode S130, processing the previous lane information, information on the ego vehicle, and information on the front vehicle S140 may be performed. Here, the previous lane information (previously obtained lane information) may be lane information when the lane was recognized normally, and the information of the ego vehicle and the front vehicle may be driving status information (position, speed, direction, etc.) of the ego vehicle and the front vehicle.

Additionally, after the information processing step is performed, generating a virtual lane based on the processed information S150 may be performed. Additionally, after generating the virtual lane, a vehicle control step S160 may be performed in which the ego vehicle is controlled based on the generated virtual lane.

Hereinafter, with reference to FIGS. 3 to 8, the information processing step S140 and the virtual lane generation step S150 will be explained in more detail.

Figure 3:
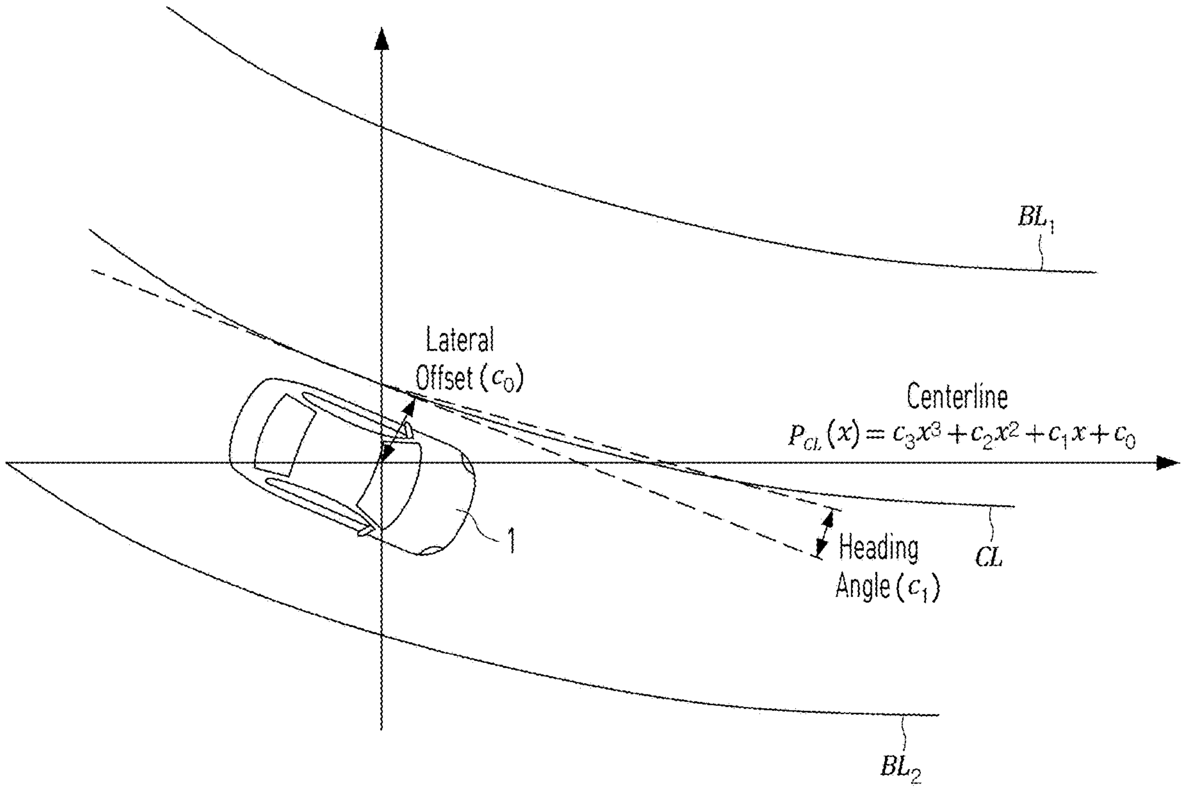
FIG. 3 is a diagram illustrating a method of representing a center line as a third-order polynomial using lane information.

First, FIG. 3 is a diagram illustrating a method of representing a center line as a third-order polynomial using lane information.

The road infrastructure comprises an intricate network of interconnected elements, including lane markings, road borders, directional indicators, and so on. Vehicles comprehensively utilize information from these factors to estimate the center line to follow on the road. Typically, the vehicle system analyzes detected road markings and borders to estimate the center line of the road. Midpoints between estimated and detected lane markings may be identified. The center line may be described using the $n^{th}$ order polynomial depending on the complexity of the lane shape. For example, if there is a center line CL and there are border lines $BL_1$, $BL_2$ on both sides as shown in FIG. 3, the center line CL may be represented as a third-order polynomial of the longitudinal distance x (Equation 1).

$$p_{CL}(x) = c_3x^3 + c_2x^2 + c_1x + c_0 \quad \text{[Equation 1]}$$

Here, $c_0$, $c_1$, $c_2$, $c_3$ are the lane coefficients, $c_0$[m] is the lane position (lateral offset), $c_1$ [radian] is the heading angle (relative heading), and $2*c_2$[1/m] is the lane curvature, $6*c_3[1/m^2]$, is the lane curvature derivative or the lane curvature rate at x=0, respectively. In this way, lane information may be represented as the third-order polynomial, and the virtual lane to be generated in the embodiment of the present disclosure may be generated as a third-order polynomial through coefficient estimation.

Figure 4:
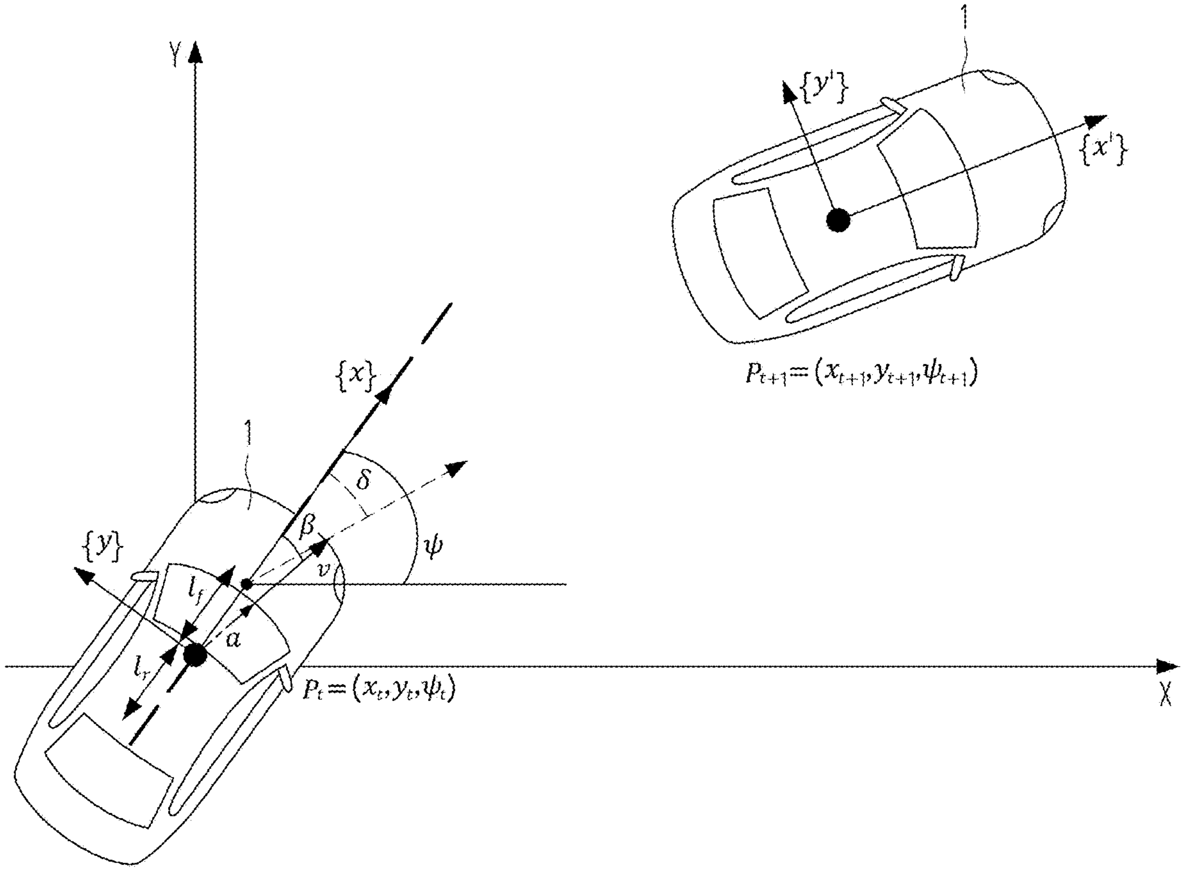
FIG. 4 is a diagram showing a Kinematic bicycle model and a relative movement of a vehicle in an inertial frame in the method for generating the virtual lane according to the embodiment of the present disclosure.

FIG. 4 is a diagram showing a Kinematic bicycle model and a relative movement of a vehicle in an inertial frame in the method for generating the virtual lane according to the embodiment of the present disclosure.

First, the position information of the ego vehicle may be updated using a Dead Reckoning (DR) technique. If the lane detection system fails, the localization system based on the image sensor or LiDAR sensor may also fail. Therefore, a dead reckoning technique may be introduced to determine changes in the position of the ego vehicle.

Dead reckoning is a technique for identifying changes in the position of the vehicle and is based on the principle that the position of the vehicle may be determined at a specific moment if the initial position and displacements are known. This technique is designed to calculate both the driving distance and the direction, and allows the vehicle's movement (position, attitude) to be estimated using a Vehicle Kinematics Model.

The equation according to FIG. 4 is as follows.

$$\dot{x} = v \cdot \cos(\psi + \beta) \quad \text{[Equation 2]}$$
$$\dot{y} = v \cdot \sin(\psi + \beta)$$
$$\dot{v} = a$$
$$\beta = \tan^{-1}\left(\frac{l_r}{l_f + l_r}\tan(\delta)\right)$$

In Equation 2 above, (x, y) is the position which locate the center of gravity of the vehicle 1 in the inertial frame, v is the velocity of the vehicle 1, and ψ is the yaw angle which describes the rotation of the vehicle 1 about the vertical axis. β is the side slip angle which represents the angle between the vehicle's velocity and the longitudinal axis, which may be a measure of the lateral deviation of the vehicle 1 from the intended path.

The length parameters $l_f$, $l_r$ may represent the distance from the center of gravity of the vehicle to the front and rear wheels, respectively. The control inputs are acceleration and steering angle α, δ. The steering angle may represent the angle between the orientation of the front wheels and the longitudinal axis of the vehicle. Since most vehicles cannot steer the rear wheels, it may be assumed that $\delta r=0 \therefore \delta=\delta f$.

Dead Reckoning (DR) utilizes the velocity and yaw rate of the vehicle's motion states, along with a rotation sensor to calculate the driving trajectory repeatedly, based on Equation 2 above, under the assumption that the speed, yaw rate, and attitude are constant during each sample period. Using the calculated changes in position and attitude, a transformation matrix may be created to align all information in the same time sequence (coordinate transformation), and this transformation may be equally applied to previously obtained information.

In other words, if performing the DR update, since the previous lane information (previously obtained lane information) becomes different from the current lane information, it is necessary to perform coordinate transformation. Thus, the amount of change in heading and position of the vehicle derived based on the DR update may be obtained as the transformation matrix, and processed to use previous lane information suitable for the current location through this coordinate transformation.

On the other hand, due to sensor inaccuracies and the assumption of constant speed, yaw rate, and attitude over a sample period, errors may occur in position and attitude. These errors tend to be accumulated as the vehicle continues to move, and the calculated position and attitude may become less accurate over time. To solve this problem, a threshold distance may be established, indicating the range within which DR information is considered reliable. Further, reliability information according to this threshold distance may be reflected in the weighting matrix, as described later.

Figure 5:
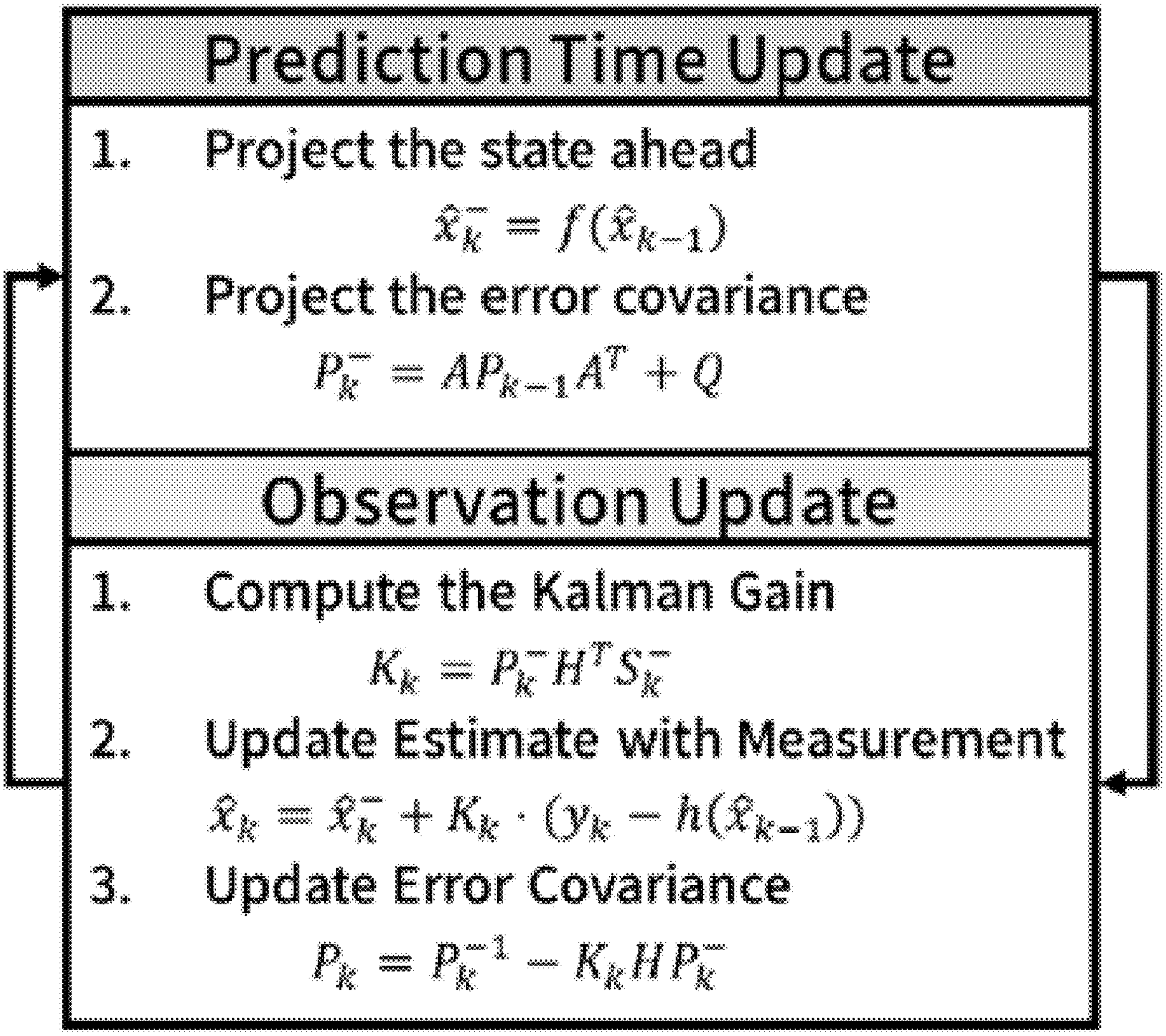
FIG. 5 is a diagram showing an Extended Kalman Filter (EKF) process according to the embodiment of the present disclosure.

FIG. 5 is a diagram showing an Extended Kalman Filter (EKF) process according to the embodiment of the present disclosure.

The Extended Kalman Filter (EKF) predicts the state of the ego vehicle (position, speed, direction, etc.) and the state of the front vehicle (CIPV) for generating the virtual lane, and the EKF may be a process that allows to increase the accuracy of prediction by considering the uncertainty of sensor data.

Referring to FIG. 5, first, the vehicle state and the error covariance regarding uncertainty may be predicted using the vehicle model (Prediction Time Update). Then, through Observation Update, the Kalman gain may be calculated, and weights may be assigned according to the respective uncertainties of the predicted state and observation.

Then, the posterior probability may be estimated based on the calculated Kalman gain. Specifically, two types of EKF observers customized for estimating the state and covariance parameters may be designed. One may be tailored for the ego vehicle and the other may be tailored for the front vehicle. The estimated states may be served as initial values for physics-based trajectory prediction using the EKF prediction module.

In this regard, if the virtual lane is generated using only the position of the front vehicle, the performance of the generated virtual lane may be low.

Meanwhile, by tracking the position of the front vehicle using the Extended Kalman Filter and updating the error covariance, the predicted position of the front vehicle can be effectively calculated. Further, by generating the virtual lane using the predicted position of the front vehicle obtained by applying the calculated error covariance to the weight, it is possible to effectively generate the virtual lane with better performance.

Figure 6:
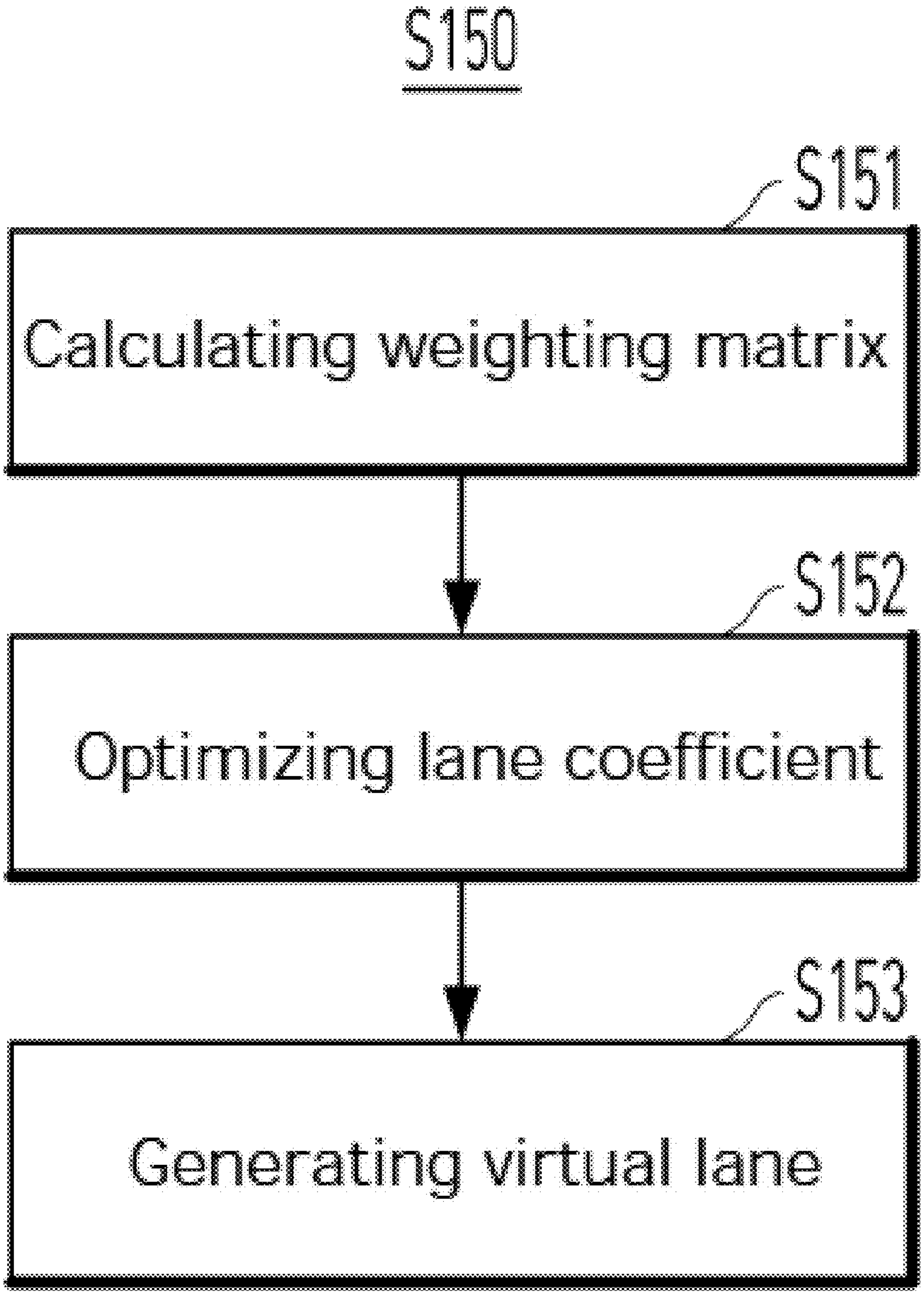
FIG. 6 is a control flowchart illustrating in more detail the step of generating the virtual lane according to an embodiment of the present disclosure.

FIG. 6 is a control flowchart illustrating in more detail the step of generating the virtual lane according to an embodiment of the present disclosure.

Referring to FIG. 6, the virtual lane generation step S150 according to the embodiment of the present disclosure may include calculating a weighting matrix S151, optimizing lane coefficients S152, and generating the virtual lane based on the optimized lane coefficients S153.

Figure 7:
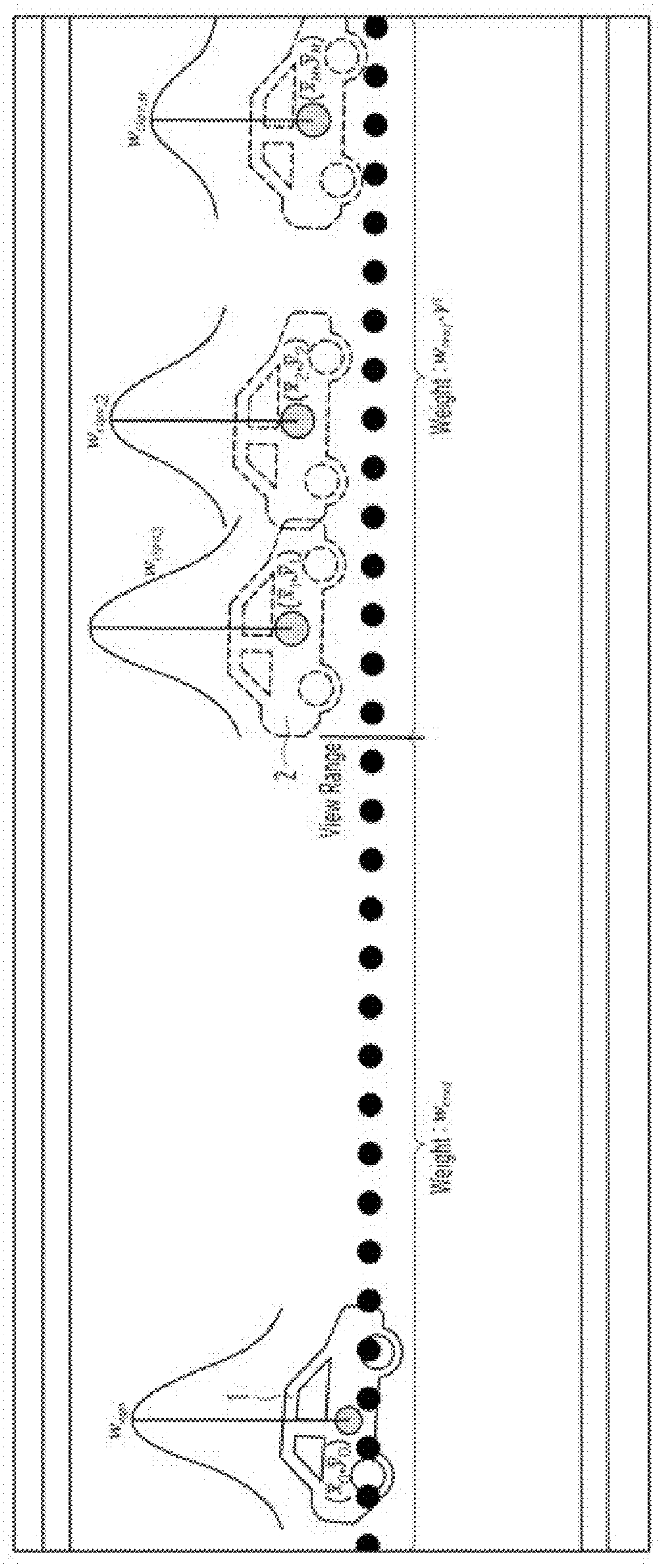
FIG. 7 is a diagram showing the lane information and the predicted trajectory of the front vehicle with covariance in the step of calculating the weighting matrix in the method for generating the virtual lane according to the embodiment of the present disclosure.

FIG. 7 is a diagram showing the lane information and the predicted trajectory of the front vehicle with covariance in the step of calculating the weighting matrix in the method for generating the virtual lane according to the embodiment of the present disclosure.

In generating the weighting matrix, it provides reliable accuracy up to a certain view range, but the accuracy may decrease beyond the view range. Therefore, uncertainty may be set to increase for lane information that exceeds the predefined view range (viewing range). The predicted state of the vehicle may be accurate in the short term, but may not be sustainable in the long term, resulting in a significantly large covariance.

This covariance may represent the uncertainty of the vehicle state and may indicate the reliability of the information. The eigenvalue of the covariance matrix may be used for the x and y positions, serving as the uncertainty factor that reflects the magnitude of the covariance. Uncertainties set for lane information and vehicle information may be normalized, and then reciprocals may be taken, and a weighting matrix may be generated accordingly.

Specifically, as shown in FIG. 7, the lane information may be reliable up to the view range where the lane can be recognized, so when calculating the weight, $w_{traj}$ may be directly applied (high reliability).

$$x < \text{View Range: } w_{traj}$$

Meanwhile, in the range beyond the view range, the weight value may be lowered by multiplying $\gamma$ (a user parameter).

$$x \geq \text{View Range: } w_{traj} \cdot \gamma^i$$

$$\text{where } \gamma^i = \{\gamma^i \in \mathbb{N} \mid i \in \mathbb{N},\ 1 \leq i \leq N\}$$

Here, the values of $w_{traj}$, $\gamma$, and N may be user parameters (values that may be set by the user).

In other words, when designing the weighting matrix for the lane, the weight should be high (using the constant value $w_{traj}$) for the area within the viewing range, i.e., the area that can be tracked well, and the weights should be low (using the value multiplied by $\gamma$) for the area where the tracking is not possible, thereby assigning the weights with optimization.

In addition, when designing the weighting matrix for the front vehicle (CIPV), the weights may be optimally assigned so that the weight is high for the current position of the ego vehicle and the front vehicle, and the weight is low for the predicted position of the front vehicle. Meanwhile, weights related to the position and predicted position of the front vehicle may be designed using the error covariance obtained through the Extended Kalman Filter.

In other words, when calculating the weighting matrix for the lane, the weight for lane information within the view range of the ego vehicle may be set to be higher than the weight for lane information beyond the view range. Further, when calculating the weighting matrix for the front vehicle, the weight for the current location of the front vehicle may be set to be higher than the weight for the predicted position of the front vehicle.

Accordingly, if the weighting matrix for the lane is W and the weighting matrix for the front vehicle is V, the weighting matrices W and V may be expressed as follows.

$$W = \begin{bmatrix} w_{traj} & \cdots & 0 & & & \\ \vdots & \ddots & \vdots & & 0 & \\ 0 & \cdots & w_{traj} & & & \\ & & & w_{traj} \cdot \gamma^R & \cdots & 0 \\ & 0 & & \vdots & \ddots & \vdots \\ & & & 0 & \cdots & w_{traj} \cdot \gamma^N \end{bmatrix},$$

$$V = \begin{bmatrix} w_{ego} & & 0 & \\ & w_{cipv,1} & \cdots & 0 \\ 0 & \vdots & \ddots & \vdots \\ & 0 & \cdots & w_{cipv,M} \end{bmatrix}$$

$$1 \leq n \leq N, \quad w_{cipv,j} = \frac{1}{\sqrt{\sigma_x^2 + \sigma_y^2}} \quad (j = 1, \ldots, M)$$

Figure 8:
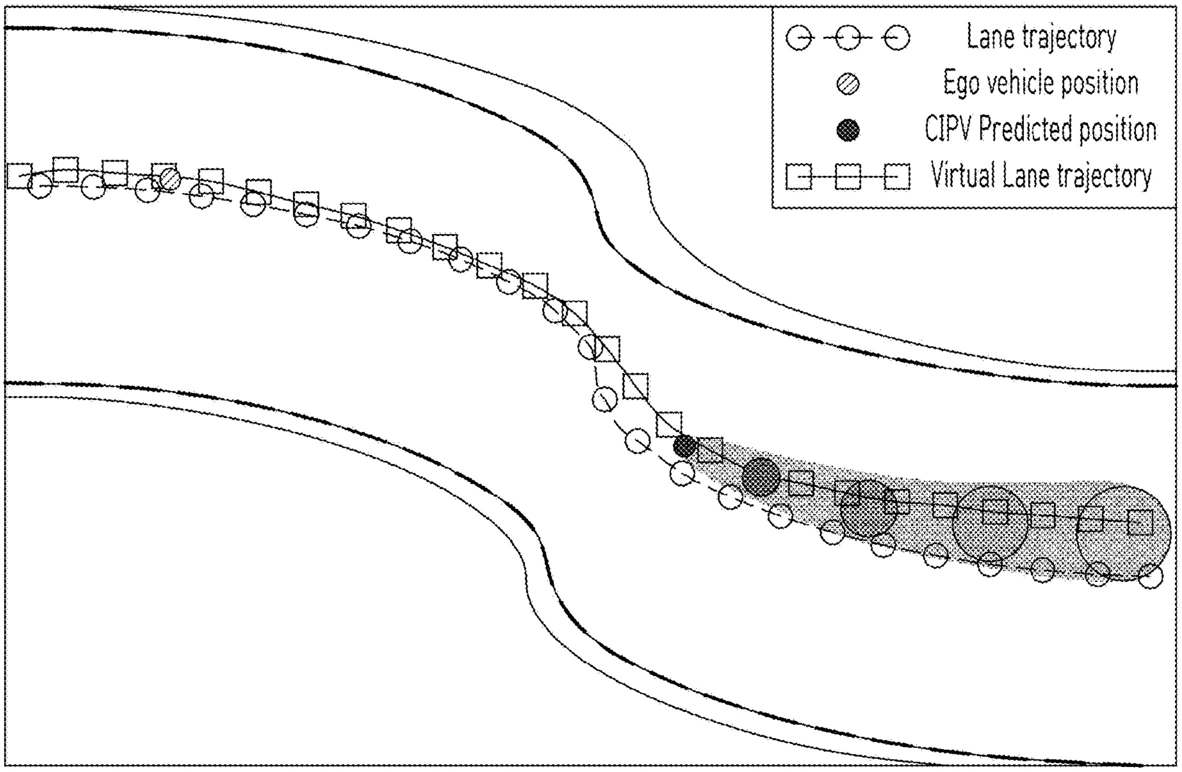
FIG. 8 is a diagram showing the previous lane information, the position of the ego vehicle, the predicted position of the front vehicle, and the trajectory of the generated virtual lane, in the method for generating the virtual lane according to the embodiment of the present disclosure.

FIG. 8 is a diagram showing the previous lane information, the position of the ego vehicle, the predicted position of the front vehicle, and the trajectory of the generated virtual lane, in the method for generating the virtual lane according to the embodiment of the present disclosure.

In the virtual lane generation step according to the embodiment of the present disclosure, the virtual lane may be generated by estimating the lane coefficients by optimizing the previous lane information, the position of the ego vehicle, and the predicted position of the front vehicle using a weighted least squares method.

Here, the estimation of lane coefficients (parameters) may be performed by optimizing the previous lane information and the predicted states of the front vehicle (CIPV) and the ego vehicle by using Weighted Least Squares (WLS) and Tikhonov regularization.

The Weighted Least Squares (WLS) is a statistical method used to fit a regression model to data, where observations have different levels of precision or variability. This may be an extension of ordinary least squares (OLS) regression, which assumes that all observations have the same variance.

The basic idea behind the Weighted Least Squares (WLS) is to assign different weights to each observation based on its reliability or variance. Observations with lower variance may be given higher weights to have more influence on estimating the regression coefficients, and conversely, observations with higher variance may be given lower weights to have less influence. The WLS method aims to minimize the sum of squared weighted residuals, and the sum of squared weighted residuals may be defined as follows.

$$J(\beta_l) = (y - A\beta_l)^T W(y - A\beta_l) + (z - B\beta_l)^T V(Z - B\beta_l) \quad \text{[Equation 3]}$$

Here, y, z, A, and B may be expressed as follows.

$$y = \begin{bmatrix} y_0 \\ \vdots \\ y_N \end{bmatrix},\ z = \begin{bmatrix} \overline{y}_0 \\ \overline{y}_1 \\ \vdots \\ \overline{y}_M \end{bmatrix},\ A = \begin{bmatrix} 1 & x_1 & x_1^2 & x_1^3 \\ \vdots & \vdots & \vdots & \vdots \\ 1 & x_N & x_N^2 & x_N^3 \end{bmatrix},\ B = \begin{bmatrix} 1 & \overline{x}_0^1 & \overline{x}_0^2 & \overline{x}_0^3 \\ 1 & \overline{x}_1^1 & \overline{x}_1^2 & \overline{x}_1^3 \\ \vdots & \vdots & \vdots & \vdots \\ 1 & \overline{x}_M^1 & \overline{x}_M^2 & \overline{x}_M^3 \end{bmatrix}$$

Here, $\beta_1=[c_0\ c_1\ c_2\ c_3]$ is the lane polynomial parameter (lane coefficient) to be optimized, and $y=[y_1\ y_2\ .\ .\ .\ y_N]^T$ is the calculated lateral position of the previous lane for the longitudinal distance x. $z=[\overline{y}_0\overline{y}_1\ .\ .\ .\ \overline{y}_M]^T$ is the lateral position of the ego vehicle $(\overline{x}_0, \overline{y}_0)$, and the predicted position (trajectory) of the front vehicle corresponds to $\{(\overline{x}_1, \overline{y}_1), \ldots, (\overline{x}_M, \overline{y}_M)\}$. A and B are vandermonde matrices that formulate the geometric sequence as a matrix regarding the longitudinal distance. W and V are weighting matrices calculated previously. That is, lane information and information about the position of the ego vehicle and the front vehicle (CIPV) may be expressed as follows.

Lane Information

Lane position: $\{(x_1, y_1), \ldots, (x_N, y_N)\}$

Estimated lateral Position: $A\cdot\beta_1$

Weighting matrix: W

Ego vehicle and CIPV position

Ego vehicle position: $(\overline{x}_0, \overline{y}_0)$

Predicted CIPV position: $\{(\overline{x}_1, \overline{y}_1, \ldots (\overline{x}_M, \overline{y}_M)\}$ Lateral position: $z=[\overline{y}_0\ \overline{y}_1\ .\ .\ .\ y_M]^T$ Estimated lateral position: $\beta\cdot\beta_1$:

Weighting matrix: V

To minimize the function of Equation 3, the derivative with respect to $\beta_1$ may be set to 0 and the following equation may be obtained.

$$\beta_l = (A^T WA + B^T VB)^{-1}(A^T Wy + B^T Vz) \quad \text{[Equation 4]}$$

Tikhonov regularization is a technique used in mathematical optimization that aims to find coefficients that minimize the difference between observed and predicted values. Tikhonov regularization introduces a penalty term, known as the regularization term, into the standard linear regression objective function. This penalty term discourages large difference of coefficient values, effectively shrinking them towards zero. The modified objective function for Tikhonov regularization is as follows.

$$J(\beta_l) = (y - A\beta_l)^T(y - A\beta_l) + (\beta_l - \beta_{l,p})^T Q(\beta_l - \beta_{l,p}) \quad \text{[Equation 5]}$$

Here, $\beta_{l,p}=[c_{0,p}\ c_{1,p}\ c_{2,p}\ c_{3,p}]$ is previous (previously obtained) lane polynomial parameter used to calculate the lateral position of the previous lane using the lane polynomial equation. Q is the weighting matrix containing the user-defined normalization parameter which can be selected through cross-validation or domain knowledge. Q may be expressed as follows.

$$Q = \begin{bmatrix} w_{c_0} & \cdots & 0 \\ \vdots & \ddots & \vdots \\ 0 & \cdots & w_{c_3} \end{bmatrix}$$

The regularization parameter controls the trade-off between fitting the data well and keeping the coefficients small. A larger value of results in more shrinkage of the coefficients towards 0, reducing the risk of overfitting. Like the WLS, the optimized solution may be obtained by taking the derivative with respect to $\beta_1$ and setting it equal to 0.

$$J(\beta_l) = (A^T A + Q)^{-1}(A^T y + Q\beta_{l,p}) \quad \text{[Equation 6]}$$

Next, incorporating weights into the regularization framework may provide to formulate the WLS problem with Tikhonov regularization. This may correspond to an extension of the WLS method accompanying the regularization term with the weighting matrix for the objective function. This formulation can effectively adjust for varying levels of reliability in the data and produce more robust parameter estimates. The modified objective function for Tikhonov regularization is as follows.

$$J(\beta_l) = (y - A\beta_l)^T W(y - A\beta_l) + (z - B\beta_l)^T V(z - B\beta_l) + (\beta_l - \beta_{l,p})^T Q(\beta_l - \beta_{l,p}) \quad \text{[Equation 7]}$$

The first term of the objective function may represent the weighted error with previous lane information. The second term may represent the weighted error with the ego vehicle and the predicted trajectory of the front vehicle. The final term of the objective function may be a Tikhonov regularization term used to regularize changes in coefficients.

That is, the first term is an error term for the lane information, the second term is an error term for the ego vehicle and the front vehicle, and the third term is a regularization error term for regularization. The regularization error term may refer to regularization for reducing the error with respect to the previous lane coefficients. By including the regularization error term, the difference between the generated virtual lane and the actual lane can be reduced, thereby preventing situations in which the driver should suddenly operate the steering wheel.

By deriving parameters that make the objective function to be the minimum value, the lane coefficients can be optimized. That is, according to the objective function, the optimal lane coefficients can be obtained such that the sum of the terms regarding the error with the previous lane information, the error with the position of the ego vehicle and the predicted position of the front vehicle, and the error with the previously obtained lane coefficient has the minimum value.

Meanwhile, by allocating the lateral position [y z] as Y, the vandermonde matrices [A B] as X, and the weighting matrix [W, V] as P, the objective function may be summarized as follows.

$$J(\beta_l) = (Y - X\beta_l)^T P(Y - X\beta_l) + (\beta_l - \beta_{l,p})^T Q(\beta_l - \beta_{l,p}) \quad \text{[Equation 8]}$$

Here, Y, X, and P can be expressed as follows.

$$Y = [yz] = [y_1 y_2 \ \ldots \ y_N \bar{y}_0 \bar{y}_1 \ \ldots \ \bar{y}_M],$$

$$X = [A; B] \begin{bmatrix} 1 & x_1 & x_1^2 & x_1^3 \\ \vdots & \vdots & \vdots & \vdots \\ 1 & x_N^1 & x_N^2 & x_N^3 \\ 1 & \bar{x}_1 & \bar{x}_1^2 & \bar{x}_1^3 \\ \vdots & \vdots & \vdots & \vdots \\ 1 & \bar{x}_M^1 & \bar{x}_M^2 & \bar{x}_M^3 \end{bmatrix}, P = \begin{bmatrix} W & 0 \\ 0 & V \end{bmatrix}$$

In order to minimize Equation 8, if the derivative for $\beta_l$ is set to 0, the following equation can be obtained.

$$\beta_l = (X^T PX + Q)^{-1}(X^T PY + Q\beta_{l,p}) \quad \text{[Equation 9]}$$

Based on the optimized lane coefficients obtained in this way, the trajectory of the center line of the virtual lane can be generated using the third-order polynomial of Equation 1, and thus the virtual lane according to the embodiment of the present disclosure can be generated.

As described above, according to the embodiment of the present disclosure, a method for generating a virtual lane when lane recognition fails can be provided. In particular, the weighting matrix of the WLS method can be continuously updated based on real-time sensor data and vehicle dynamics to ensure optimal lane parameter estimation.

According to the embodiment of the present disclosure, the state of the vehicle and the state of the front vehicle (preceding vehicle) are predicted using an Extended Kalman Filter (EKF), and the Weighted Least Squares (WLS) method. By combining Weighted Least Squares (WLS) and Tikhonov Regularization, the lane parameters can be optimized. Through this, it is possible to generate a highly reliable virtual lane in consideration of noise and uncertainty of sensor data.

In addition, the generated virtual lane can be transmitted, for example, to the navigation controller of the ego vehicle, allowing the vehicle to safely maintain the path in driving. In this process, data such as the vehicle's position, speed, and direction can be continuously updated, allowing the virtual lane to be adjusted in real time.

Meanwhile, in the vehicle control step, the driving of the vehicle is controlled using the generated virtual lane until lane recognition (detection) is resumed, and when lane recognition is resumed, the vehicle control can be switched so that the vehicle is controlled based on the actually recognized lane.

FIG. 9 is a table showing error values for each lane type as results of experimental examples of generating the virtual lane by the method for generating the virtual lane according to the embodiment of the present disclosure.

The experimental example in FIG. 9 is the result of experiments when the front vehicle is 20 meters ahead. In the case of a straight road, the error regarding the lane position is approximately 2 cm (0.0219 m) for the short range (~30 m), and the error regarding the lane position is approximately 28 cm (0.281 m) for the long range (~60 m).

Also, even in the case of a high curvature road, it shows that, for the short range (~30 m), the error regarding the lane position is approximately 18 cm (0.182 m), and for the long range (~60 m), the error regarding the lane position is approximately 1.7 m (1.736 m).

In the case of both straight roads and curved roads, the error was much smaller than that of the virtual lane generated according to the existing virtual lane generation method, and it can be confirmed that more accurate virtual lane can be generated by the virtual lane generation method according to the embodiments of the present disclosure.

Figure 10:
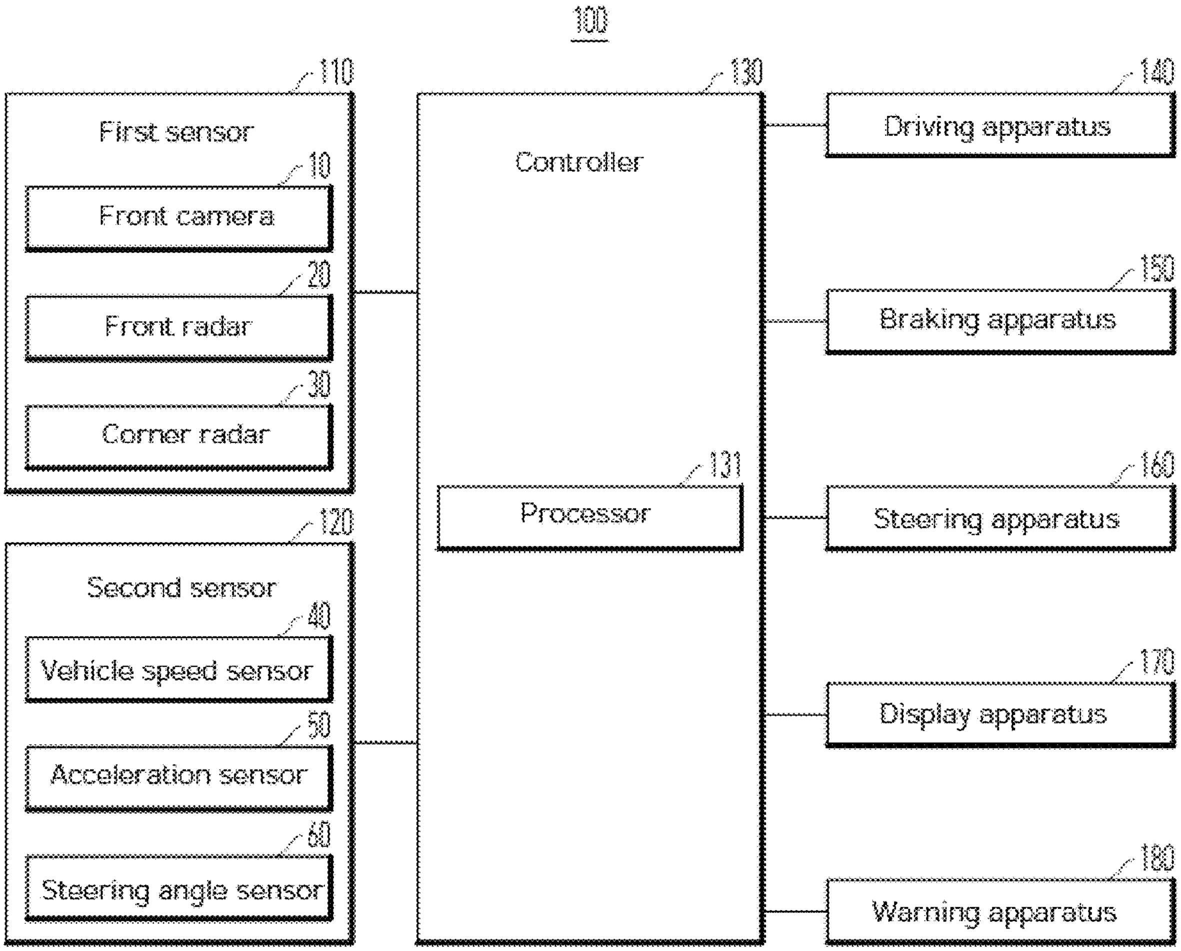
FIG. 10 is a control configuration diagram schematically showing a system for generating the virtual lane according to embodiments of the present disclosure.

FIG. 10 is a control configuration diagram schematically showing a system for generating the virtual lane according to embodiments of the present disclosure.

Referring to FIG. 10, the system for generating the virtual lane 100 according to embodiments of the present disclosure may include a first sensor 110 configured to detect a lane in front of the ego vehicle and a front vehicle in front of the ego vehicle, and a second sensor 120 configured to detect body information of the ego vehicle, and a controller 130 comprising at least one processor 131 configured to process detection results of the first sensor 110 and the second sensor 120.

The controller 130 may determine whether conditions for entering the virtual lane generation mode are satisfied in a lane recognition limit situation in which the lane in front of the ego vehicle is not recognized. If it is entered the virtual lane generation mode, the controller 130 may generate the virtual lane based on the previous lane information, information of the ego vehicle and information of the front vehicle processed in the at least one processor 131, and may control the ego vehicle based on the generated virtual lane.

In addition, the controller 130 may determine that the conditions for entering the virtual lane generation mode are satisfied if the distance between the ego vehicle and the front vehicle is less than a predetermined distance, the difference between the heading angles of the ego vehicle and the front vehicle is less than a predetermined angle, and the speed of the ego vehicle is less than a predetermined speed.

The at least one processor 131 may update the position information of the ego vehicle using a dead reckoning (DR) technique, perform coordinate transformation to use previous lane information for current position, and calculate the predicted position of the front vehicle using the Extended Kalman Filter (EKF).

In addition, the controller 130 may generate the virtual lane by calculating the weighting matrix for the lane and the weighting matrix for the front vehicle based on lane information according to the view range of the ego vehicle and position information according to the predicted position of the front vehicle, and by optimizing lane coefficients based on the calculated weighting matrix for the lane and the calculated weighting matrix for the front vehicle.

Since the method for processing the information by the at least one processor 131 and the method for generating the virtual lane by the controller 130 according to the embodiments of the present disclosure have been described in detail previously, detailed descriptions will be omitted here.

The first sensor 110 may comprise at least one of a front camera 10, a front radar 20, or at least one corner radar 30 configured to detect the lane in front of the ego vehicle and the front vehicle (CIPV) located in front of the ego vehicle. However, the present disclosure is not limited thereto, and as long as it is a sensor for detecting the surroundings of the ego vehicle, it may include other types of sensors for detecting the surroundings of the ego vehicle, such as ultrasonic sensors and lidar sensors.

The second sensor 120 may be a sensor configured to detect body information of the ego vehicle and may include at least one of a vehicle speed sensor 40, an acceleration sensor 50, or a steering angle sensor 60. These sensors may detect body information of the ego vehicle, such as the speed (velocity), the acceleration, the steering angle, etc.

Meanwhile, the controller 130 according to the embodiments of the present disclosure may be connected with a driving apparatus 140 configured to control the driving (longitudinal driving) of the ego vehicle, a braking apparatus 150 configured to control the braking of the ego vehicle, and a steering apparatus 160 configured to control the lateral driving of the ego vehicle. Accordingly, in operating the driver assistance function based on the generated virtual lane, the controller 130 may control at least one of the driving apparatus 140, the braking apparatus 150, or the steering apparatus 160 to control the driving of the ego vehicle.

In addition, the system for generating the virtual lane 100 according to embodiments of the present disclosure may further comprise a display apparatus 170 configured to display the generated virtual lane to the driver of the ego vehicle, and a warning apparatus 180 configured to provide a warning function such as a lane departure warning to the driver in operating the driver assistance function based on the generated virtual lane.

In this way, the display apparatus 170 may display the virtual lane to the driver when the driver assistance system is operating, and the warning apparatus 180 may issue a warning to the driver in operating the driver assistance function based on the lane recognition such as a lane departure warning function.

The warning apparatus 180 may include at least one of a visual alarm device, an audible alarm device, or a haptic alarm device, and accordingly, the driver may be alerted for the warning such as the lane departure warning, through a visual alarm, an auditory alarm, and/or a haptic alarm.

The disclosed embodiments may also be implemented as a computer-readable program on a computer-readable recording medium in order to be executed by a computer. A computer-readable recording medium may be a non-transitory computer-readable recording medium, such as a data storage device capable of storing data that may be read by a processor/microprocessor.

Examples of computer-readable recording medium may include hard disk drives (HDD), solid-state drives (SSD), silicon disk drives (SDD), read-only memory (ROM), CD-ROM, magnetic tape, floppy disks, optical data storage devices, etc.

According to the embodiments of the present disclosure as described above, it is possible to provide a method and system for generating a virtual lane that can effectively generate the virtual lane using the previous lane coefficients before the lane recognition limit situation, the position information of the ego vehicle, and the predicted position information of the front vehicle.

Further, according to the embodiments of the present disclosure, it is possible to provide a method and system for generating a virtual lane that can significantly improve the overall safety and reliability of the autonomous vehicle in that the vehicle can drive safely by the virtual lane generation even in situations where the lane recognition is limited, and in particular, that the vehicle can maintain the driving path even in situations where the existing lane detection system fails.

In addition, according to the method and system for generating the virtual lane according to the embodiments of the present disclosure, it is possible to generate the stable and accurate virtual lane utilizing algorithms such as Extended Kalman Filter (EKF), Weighted Least Squares (WLS), and Tikhonov Regularization, and smoothly estimate the lane parameters even in case that the lane coefficients are unstable.

Moreover, according to the embodiments of the present disclosure, it is possible to generate the virtual lane only with camera information without using HD Map and/or GPS information.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1: Ego vehicle
2: Front vehicle (CIPV)
CL: Center line
$BL_1$, $BL_2$: Border line
10: Front camera
20: Front radar
30: Corner radar
40: Vehicle speed sensor
50: Acceleration sensor
60: Steering angle sensor
100: System for generating virtual lane
110: First sensor
120: Second sensor
130: Controller
131: Processor
140: Driving apparatus
150: Braking apparatus
160: Steering apparatus
170: Display apparatus
180: Warning apparatus

What is claimed is:

1. A method for generating a virtual lane, comprising:

determining a lane recognition limit situation in which a lane in front of an ego vehicle is not recognized;

determining whether conditions for entering a virtual lane generation mode are satisfied in the lane recognition limit situation;

if the conditions for entering the virtual lane generation mode are satisfied, entering the virtual lane generation mode;

processing previous lane information, information of the ego vehicle, and information of a front vehicle;

generating the virtual lane based on the processed information; and controlling the ego vehicle based on the generated virtual lane, wherein the processing of information further comprises estimating a predicted position of the front vehicle using an Extended Kalman Filter, and the generating of the virtual lane comprises: calculating a weighting matrix for the lane and a weighting matrix for the front vehicle based on lane information according to a view range of the ego vehicle and position information according to the predicted position of the front vehicle; and optimizing lane coefficients based on the calculated weighting matrix for the lane and the weighting matrix for the front vehicle.

2. The method of claim 1, wherein the lane recognition limit situation in which the lane in front of the ego vehicle is not recognized is a situation in which the lane is not recognized because the lane is obscured by the front vehicle.

3. The method of claim 2, wherein if a distance between the ego vehicle and the front vehicle is less than a predetermined distance, a difference between heading angles of the ego vehicle and the front vehicle is less than a predetermined angle, and a speed of the ego vehicle is less than a predetermined speed, the virtual lane generation mode is entered.

4. The method of claim 2, wherein if a distance between the ego vehicle and the front vehicle is less than a predetermined distance, a difference between heading angles of the ego vehicle and the front vehicle is less than a predetermined angle, and a speed of the ego vehicle is less than a predetermined speed, it is entered the virtual lane generation mode.

5. The method of claim 1, wherein in calculating the weighting matrix for the lane, a weight for lane information within the view range of the ego vehicle is set to be higher than a weight for lane information beyond the view range of the ego vehicle, and wherein in calculating the weighting matrix for the front vehicle, a weight for current position of the front vehicle is set to be higher than a weight for predicted position of the front vehicle.

6. The method of claim 5, wherein in optimizing of the lane coefficients, optimal lane coefficients are obtained such that an objective function regarding an error regarding the previous lane information, an error regarding a position of the ego vehicle and the predicted position of the front vehicle, and an error for previously obtained lane coefficients has a minimum value, by using a Weighted Least Squares method according to Tikhonov regularization.

7. The method of claim 6, wherein the generating of the virtual lane comprises generating the virtual lane by generating a center line trajectory of the virtual lane using a third-order polynomial based on the optimal lane coefficients obtained in the optimizing of the lane coefficients.

8. The method of claim 1, wherein the controlling of the ego vehicle comprises controlling driving of the ego vehicle using the generated virtual lane until lane recognition is resumed, and when the lane recognition is resumed, the ego vehicle is controlled based on an actually recognized lane.

9. A system for generating a virtual lane, comprising:

a first sensor configured to detect a lane in front of an ego vehicle and a front vehicle in front of the ego vehicle;

a second sensor configured to detect body information of the ego vehicle; and a controller comprising at least one processor configured to process detection results of the first sensor and the second sensor, wherein the controller configured to determine whether conditions for entering a virtual lane generation mode are satisfied in a lane recognition limit situation in which the lane in front of the ego vehicle is not recognized, and if it is entered the virtual lane generation mode, the controller is configured to generate the virtual lane base on previous lane information, information of the ego vehicle, and information of the front vehicle processed by the at least one processor, and control the ego vehicle based on the generated virtual lane, wherein the at least one processor is configured to calculate a predicted position of the front vehicle using an Extended Kalman Filter, and the controller is configured to calculate a weighting matrix for the lane and a weighting matrix for the front vehicle based on lane information according to a view range of the ego vehicle and position information according to the predicted position of the front vehicle, and optimize lane coefficients based on the calculated weighting matrix for the lane and the weighting matrix for the front vehicle.

10. The system of claim 9, wherein the first sensor comprises at least one of a front camera, a front radar, or a corner radar.

11. The system of claim 10, wherein the controller is configured to determine that the conditions for entering the virtual lane generation mode are satisfied if a distance between the ego vehicle and the front vehicle is less than a predetermined distance, a difference between heading angles of the ego vehicle and the front vehicle is less than a predetermined angle, and a speed of the ego vehicle is less than a predetermined speed.

12. The system of claim 11, wherein the at least one processor is configured to update the position information of the ego vehicle using a dead reckoning technique and perform coordinate transformation to use previous lane information for current position.

13. The system of claim 9, wherein the controller is configured to obtain optimal lane coefficients such that an objective function regarding an error regarding the previous lane information, an error regarding a position of the ego vehicle and the predicted position of the front vehicle, and an error for previously obtained lane coefficients has a minimum value, by using a Weighted Least Squares method according to Tikhonov regularization.

14. The system of claim 13, wherein the controller is connected with a driving apparatus configured to control driving of the ego vehicle, a braking apparatus configured to control braking of the ego vehicle, and a steering apparatus configured to control lateral driving of the ego vehicle, and the controller is configured to control the ego vehicle by controlling at least one of the driving apparatus, the braking apparatus, or the steering apparatus in operating a driver assistance function based on the generated virtual lane.

15. The system of claim 14, further comprising:

a display apparatus configured to display the generated virtual lane to a driver; and a warning apparatus configured to warn the driver in operating the driver assistance function based on the generated virtual lane.

16. A non-transitory computer-readable recording medium that records a program for executing a method for generating a virtual lane on a computer, the method comprising:

determining a lane recognition limit situation in which a lane in front of an ego vehicle is not recognized;

determining whether conditions for entering a virtual lane generation mode are satisfied in the lane recognition limit situation;

if the conditions for entering the virtual lane generation mode are satisfied, entering the virtual lane generation mode;

processing previous lane information, information of the ego vehicle, and information of a front vehicle;

generating the virtual lane based on the processed information; and controlling the ego vehicle based on the generated virtual lane, wherein the processing of information further comprises estimating a predicted position of the front vehicle using an Extended Kalman Filter, and the generating of the virtual lane comprises: calculating a weighting matrix for the lane and a weighting matrix for the front vehicle based on lane information according to a view range of the ego vehicle and position information according to the predicted position of the front vehicle; and optimizing lane coefficients based on the calculated weighting matrix for the lane and the weighting matrix for the front vehicle.

* * * * *